Patented July 22, 1924.

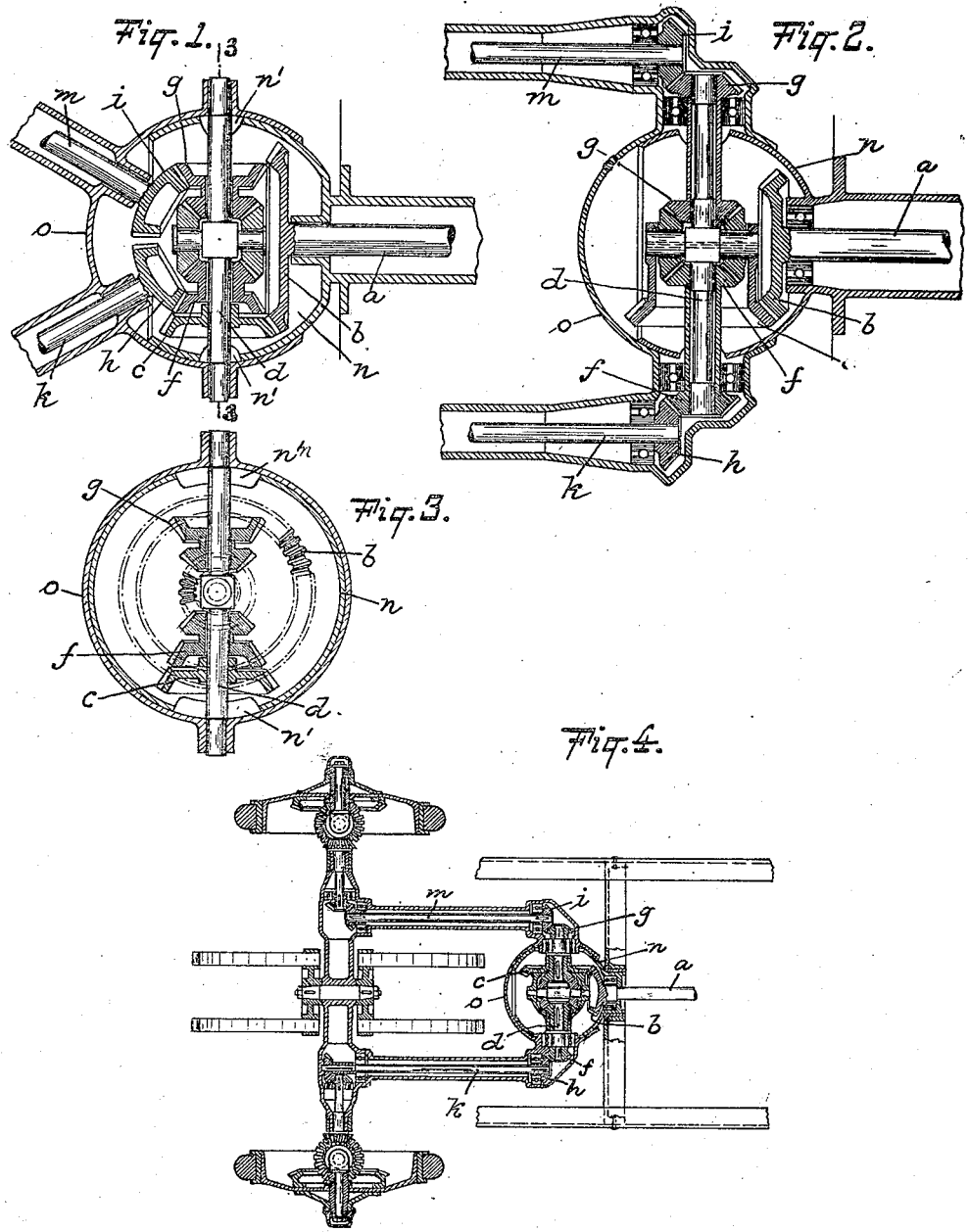

1,502,089

UNITED STATES PATENT OFFICE.

PAUL DAIMLER, OF CANNSTATT, GERMANY, ASSIGNOR TO DAIMLER-MOTOREN-GESELLSCHAFT, OF UNTERTURKHEIM, GERMANY, A CORPORATION OF GERMANY.

TOOTHED WHEEL-DRIVING MECHANISM FOR MOTOR VEHICLES.

Application filed May 27, 1919. Serial No. 300,222.

*To all whom it may concern:*

Be it known that I, PAUL DAIMLER, a citizen of Germany, and residing at Cannstatt, Wurttemberg, Germany, have invented certain new and useful Improvements in a Toothed Wheel-Driving Mechanism for Motor Vehicles (for which I have filed applications in Germany, May 10, 1918, patented September 25, 1918, No. 309,204; Czechoslovakia, May 8, 1919, patented September 18, 1920, No. 2,343; Austria, May 9, 1919, patented June 10, 1921, No. 84,314; Italy, May 19, 1919, not yet patented; France, May 26, 1919, patented January 3, 1921, No. 518,436; Spain, June 5, 1919, patented August 4, 1919, No. 69,999; Switzerland, June 13, 1919, patented November 1, 1920, No. 87,123; Hungary, June 16, 1919, patented April 23, 1920, No. 77,345; Holland, June 24, 1919, patented August 23, 1921, No. 5,972; Denmark, June 27, 1919, patented January 3, 1921, No. 27,093; Sweden, June 30, 1919, patented September 14, 1922, No. 52,790; Norway, June 30, 1919, patented January 16, 1922, No. 33,907; Belgium, September 26, 1919, Patent No. 282,465; England, June 24, 1920, Patent No. 146,156; and Poland, July 6, 1920, not yet patented), of which the following is a specification.

In motor vehicles, toothed wheel driving mechanisms in which the driving wheels of the vehicle are driven by means of separate shafts and in which the thrust beams forming casings for said shafts are fixed on the chassis by means of a ball joint are known. In a driving mechanism of the said type the differential gear is usually placed between the rear axle and the ball joint. With such an arrangement the casing of the differential gear and the adjoining shaft sleeves are subjected to considerable bending stress and thrust exerted by the rigid driving mechanism so that a frequent replacement of many parts is necessary.

This drawback is avoided in the present invention, according to which, the differential gear of the driving mechanism of the type referred to is placed in the centre of the ball joint, whereby the ball joint forms at the same time the casing for the differential gear. In this arrangement the shaft sleeves and the casings are subjected only to tensional and pushing stress so that the rigid mass represented by the driving mechanism may be made considerably lighter than in the hitherto known constructions and consequently the wear and tear of the driving parts is essentially reduced.

The invention will be more fully described hereinafter with reference to the accompanying drawings, in which it is illustrated in a convenient and practical form, and in which Figure 1 represents a driving mechanism of this type with inclined driving shafts.

Figure 2 represents a driving mechanism of this type with parallel driving shafts.

Fig. 3 is a sectional view on the line 3—3 of Fig. 2 and Fig. 4 is a fragmentary sectional plan view of a motor vehicle provided with the mechanism shown in Fig. 2.

In the arrangement illustrated in Fig. 1 the shaft $a$, by means of the bevel wheels $b$ and $c$, drives the cross pin $d$ of a differential gear, the bevel wheels $f$ and $g$ of which are in engagement with the bevel wheels $h$ and $i$ fixed on the inclined driving shafts $k$ and $m$.

Firmly secured to the journal of the shaft $a$ is the cup $n$ of a ball joint the centre of which corresponds with the centre of the cross pin of the differential gear. At the points at which said cross pin passes through the cup $n$ suitable slits or openings $n^1$ are provided on the latter. On the fixed cup $n$ is arranged the movable cup $o$ in which are journaled the cross pin $d$ of the differential gear and the two inclined driving shafts $k$ and $m$. The pivotal centre of the cup $o$ coincides with the centre of the cross pin of the differential gear. The ball joint is thus capable of swinging about the transverse axis of the differential gear and also at right angles in a plane lying in the transverse axis. The latter movement is rendered possible by the openings $n^1$ of the fixed cup $n$.

In the construction represented by Figure 2 the shaft $a$, by means of bevel wheels $b$ and $c$, drives the cross pin $d$ of the differential gear, the differential wheels $f$ and $g$ of which are in mesh with bevel wheels $h$ and $i$ carried by the two parallel driving shafts $k$ and $m$. In this construction also the cup $n$, the centre of which corresponds with the centre of the cross pin $d$, is firmly secured to the journal of the shaft $a$, and the cup $o$ is movably arranged on the cup $n$; the cup $o$ carries the journals of the cross pin $d$ and of the driving shafts $k$ and $m$. With this arrangement the cup $o$ is capable of swinging in the same way as in the first construction.

In comparison with the arrangements already known the above described constructions have the advantage that it is not necessary to interpose in the driving shaft a special universal joint as the latter is replaced by the members or cups $n$ and $o$, in which the differential gear and the shafts driving the wheels of the vehicle are journaled. The invention also offers over the ordinary constructions the advantage that the angle of inclination of one part of a shaft to the other is not limited in any way.

I claim as my invention:

1. In a toothed wheel driving mechanism for motor vehicles, the combination of a hollow ball joint, one member of which is adapted to be connected with a chassis, sleeves connected with the other member of said ball joint, driving shafts located in said sleeves and a differential gear located within and enclosed by said ball joint and having its central point coincident with the spherical centre of said ball joint.

2. In a toothed wheel driving mechanism for motor vehicles, the combination of a hollow ball joint comprising a fixed member and a movable member, differential cross-pins journalled in said movable member, differential gearing carried by said cross-pins and having its centre coincident with the spherical centre of the ball joint, sleeves connected with said movable member of said ball joint and driving shafts located in said sleeves and operatively connected with said differential gearing.

3. In a toothed wheel driving mechanism for motor vehicles, the combination of a hollow ball joint comprising a fixed member, having slits, and a movable member, differential cross-pins journalled in said movable member and projecting through the slits of said fixed member, a bevel-gear differential located within and enclosed by said ball joint and carried by said cross-pins, said differential having a central point coincident with the spherical centre of said ball joint, sleeves connected with the movable member thereof, and driving shafts in said sleeves operatively connected with said differential.

In testimony whereof I have signed my name in presence of two witnesses.

PAUL DAIMLER.

Witnesses:
ROBERT BRUHLER,
WALTER SCHWERDSFYER.